Patented Apr. 17, 1923.

1,452,219

UNITED STATES PATENT OFFICE.

ADOLPH F. POZDECH, OF NEWARK, NEW JERSEY.

ENAMEL COMPOSITION.

No Drawing.   Application filed December 23, 1921.   Serial No. 524,523.

*To all whom it may concern:*

Be it known that I, ADOLPH F. POZDECH, a citizen of Czechoslovakia, residing at Newark, in the State of New Jersey, have invented certain new and useful Improvements in Enamel Composition, of which the following is a specification.

The object of the present invention is to provide an enamel that will dry very quickly and yet have exceedingly retentive and wear-resisting properties.

The composition comprises zinc white ground to a powder, French varnish, benzine and lacquer, to which may be added any well known or desired coloring material.

As an example, the following proportions may be used, but they may be varied according to the consistency desired and the work to which it is to be applied. To one-half pint of ground zinc white is added two ounces of French varnish composed of absolute alcohol, white bleached shellac and sanderac, and the two are thoroughly mixed. A few drops of benzine, for example, ten, are then added, and afterwards there is mixed into the composition one-half ounce of a high-grade lacquer composed of amyl acetate, acetone, pyroxylin and benzine.

Experience has demonstrated that this composition will dry very quickly in approximately ten minutes, and that it will produce a hard coat that will not crack or peel.

Having thus fully described my invention, what I claim as new, and desire to secure by Letters Patent, is:—

1. A quick-drying enamel composition consisting of zinc white, varnish, a light hydrocarbon and lacquer composition.

2. A quick-drying enamel composition consisting of the following ingredients in substantially the proportions given, ground zinc white one-half pint, French varnish two ounces, benzine ten drops, lacquer one-half ounce.

In testimony whereof I affix my signature.

ADOLPH F. POZDECH.